United States Patent
Iwao

(10) Patent No.: US 6,944,646 B2
(45) Date of Patent: Sep. 13, 2005

(54) SERVER APPARATUS FOR USER DATA TRANSFER

(75) Inventor: Rika Iwao, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 665 days.

(21) Appl. No.: 09/881,726

(22) Filed: Jun. 18, 2001

(65) Prior Publication Data

US 2002/0022478 A1 Feb. 21, 2002

(30) Foreign Application Priority Data

Jul. 17, 2000 (JP) .................................... 2000-215498

(51) Int. Cl.[7] ............................................. G06F 13/00
(52) U.S. Cl. ........................................................... 709/206
(58) Field of Search .......................... 455/466; 709/204, 709/206, 220, 227, 238

(56) References Cited

U.S. PATENT DOCUMENTS 6,714,793 B1 * 3/2004 Carey et al. ................ 455/466

* cited by examiner

Primary Examiner—Robert B. Harrell
(74) Attorney, Agent, or Firm—Rabin & Berdo, P.C.

(57) ABSTRACT

A server machine to which data can easily be input from a cellar telephone, and which can deal with various services. The server machine includes a first reception device for receiving registration data containing a user identifier and user data or a recipient address and a recipient identifier, a storage unit for storing the user data, user identifier, recipient address and recipient identifier received by the first reception device such that they are associated with each other, a second reception device for receiving a user identifier and a recipient identifier from a portable terminal device, a retrieval device for retrieving user data and a recipient address associated with the user identifier and recipient identifier received by the second reception device from the storage unit, and a transmission device for transmitting the retrieved user data based on the retrieved recipient address.

10 Claims, 8 Drawing Sheets

FIG.4

| USER NAME | USER IDENTIFIER | DATA IDENTIFIER | USER DATA | RECIPIENT IDENTIFIER | RECIPIENT ADDRESS |
|---|---|---|---|---|---|
| ABCXX | XXX1 | %%1<br>%%2<br>.. | XXX1A1<br>XXX1A2<br>.. | %D1<br>%D2<br>.. | www.*..jp<br>**@..com<br>.. |
| BCDXY | XXX2 | %%1<br>%%2<br>.. | XXX2A1<br>XXX2A2<br>.. | %A1<br>%B2<br>.. | www.*..jp<br>03-1234-5678<br>.. |
| ... | | ... | ... | ... | ... |

FIG.7

| USER NAME | USER IDENTIFIER | PASSWORD | USER GROUP |
|---|---|---|---|
| ABCXX | XX001 | PABX1 | G001 |
| BCDXY | XX002 | PBCYF | G008 |
| CDEXY | XX003 | PCDX5 | G005 |
| ⋮ | ⋮ | ⋮ | ⋮ |

FIG.8

| USER GROUP | USER GROUP DATA | DISCLOSABLE USER GROUP |
|---|---|---|
| G001 | XXX1A1 | G002 |
| G002 | XYX2B1 | G001,G005 |
| G003 | XYZ0B5 | G004,G005 |
| ⋮ | ⋮ | ⋮ |

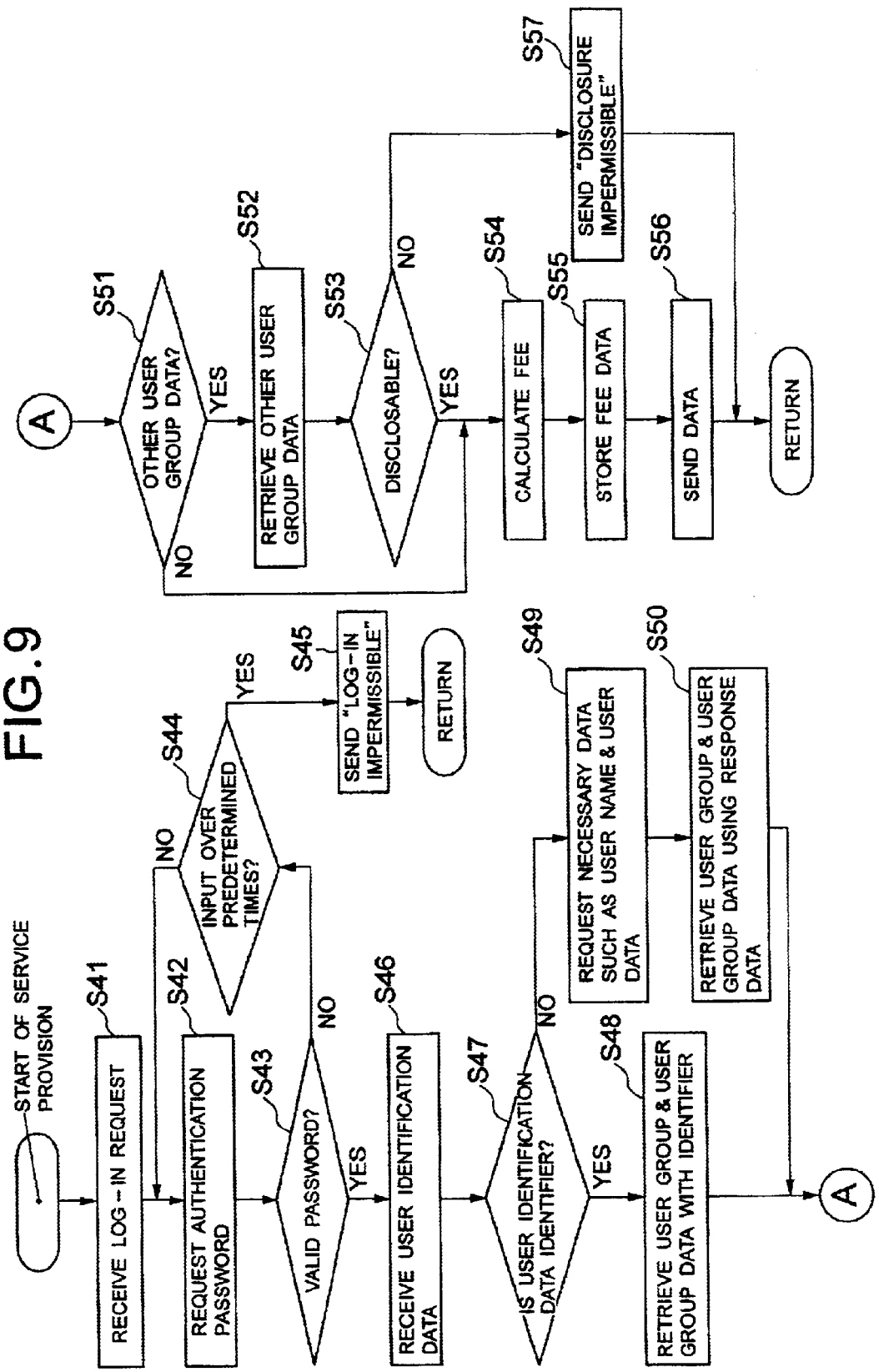

SERVER APPARATUS FOR USER DATA TRANSFER

BACKGROUND OF THE INVENTION

1. Field of the Invention

The present invention relates to a server apparatus and more particularly to a server apparatus that performs communication administration over a portable terminal device.

2. Description of the Related Art

In recent years, a portable terminal device such as a cellular telephone that can communicate via a telephone line or the like is spreading rapidly. It is also common today to connect the portable terminal device or cellular telephone to the Internet so as to receive various information from an information providing company and enjoy diverse services from a financial institute and an on-line shop, for example. Such data reception takes place via a server of a cellular telephone company and a server of a service providing company. In order to have these services, therefore, a user of the cellular telephone needs to input user data, i.e., individual information such as user's age or liking, which is required by the service providing company or the like. However, input buttons on the cellular phone or other device are small so that their operability is not good. Further, the number of the input buttons is limited, and data to be transmitted to the server also has a limitation.

OBJECTS AND SUMMARY OF THE INVENTION

As described above, an inputting operation through the conventional cellular telephone is troublesome, and the limitations are imposed on the input data. The present invention was conceived in view of these points, and its object is to provide a server apparatus that can allow easy inputting of data from the cellular telephone and cope with various services.

According to one aspect of the present invention, there is provided a server apparatus for administering communications of a portable terminal device, including first reception means for receiving registration data containing a user identifier and user data, storage means for storing the user data and user identifier received by the first reception means such that the user data and user identifier are associated with each other, second reception means for receiving a user identifier and a recipient address from the portable terminal device, retrieval means for retrieving user data associated with the user identifier received by the second reception means from the storage means, and transmission means for transmitting the retrieved user data based on the recipient address.

According to another aspect of the present invention, there is provided a server apparatus for administrating communications of a portable terminal device, including first reception means for receiving registration data containing a user identifier, user data, a recipient address and a recipient identifier, storage means for storing the user data, user identifier, recipient address and recipient identifier received by the first reception means such that they are associated with each other, second reception means for receiving a user identifier and a recipient identifier from the portable terminal device, retrieval means for retrieving user data and a recipient address associated with the user identifier and recipient identifier received by the second reception means from the storage means, and transmission means for transmitting the retrieved user data based on the retrieved recipient address.

BRIEF DESCRIPTION OF THE DRAWINGS

FIG. 4 illustrates a data structure registered in the server;

FIG. 7 illustrates a data structure registered in a server of the second embodiment;

FIG. 8 also illustrates a data structure registered in the server of the second embodiment; and FIG. 9 is a flowchart showing a procedure of a service providing routine of the server according to the second embodiment.

DETAILED DESCRIPTION OF THE INVENTION

Embodiments of the present invention will now be described in detail in reference to the accompanying drawings.

Figure 1:
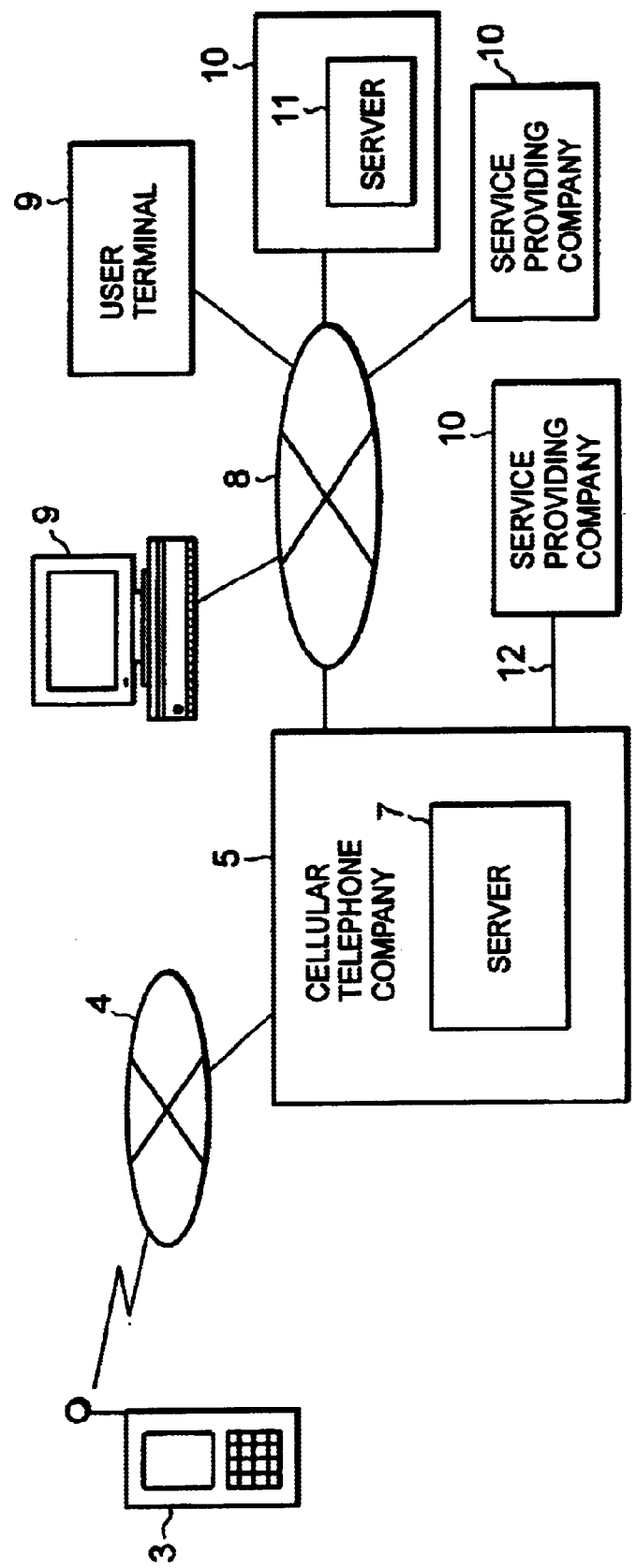
FIG. 1 illustrates one example of a structure of an information providing service system.

First Embodiment FIG. 1 illustrates an exemplary structure of an information providing service system. A portable terminal device 3 such as a cellular telephone that can communicate with a telephone line or the like is connected to a server apparatus 7 (simply referred to as "server" hereinafter) in a cellular telephone company 5 via a wireless circuit or network 4. The server 7 is connected to user terminal devices 9 such as a personal computer (PC) and a server (simply referred to as "user terminal" hereinafter) via a public line or network 8 such as PSTN and PSDN. The server 7 is also connected to a server 11 of a service providing company 10 via the public line 8 or a dedicated line 12. The server 11 is connected to other servers and data bases (not shown) through LAN or the like in the service providing company 10. An internet browser software (simply referred to as "browser software" hereinafter) has been incorporated in each of the portable terminal device 3, servers 7, 11 and user terminal 9 so that connection to the internet can be established via the above mentioned line, circuit or network.

Figure 2:
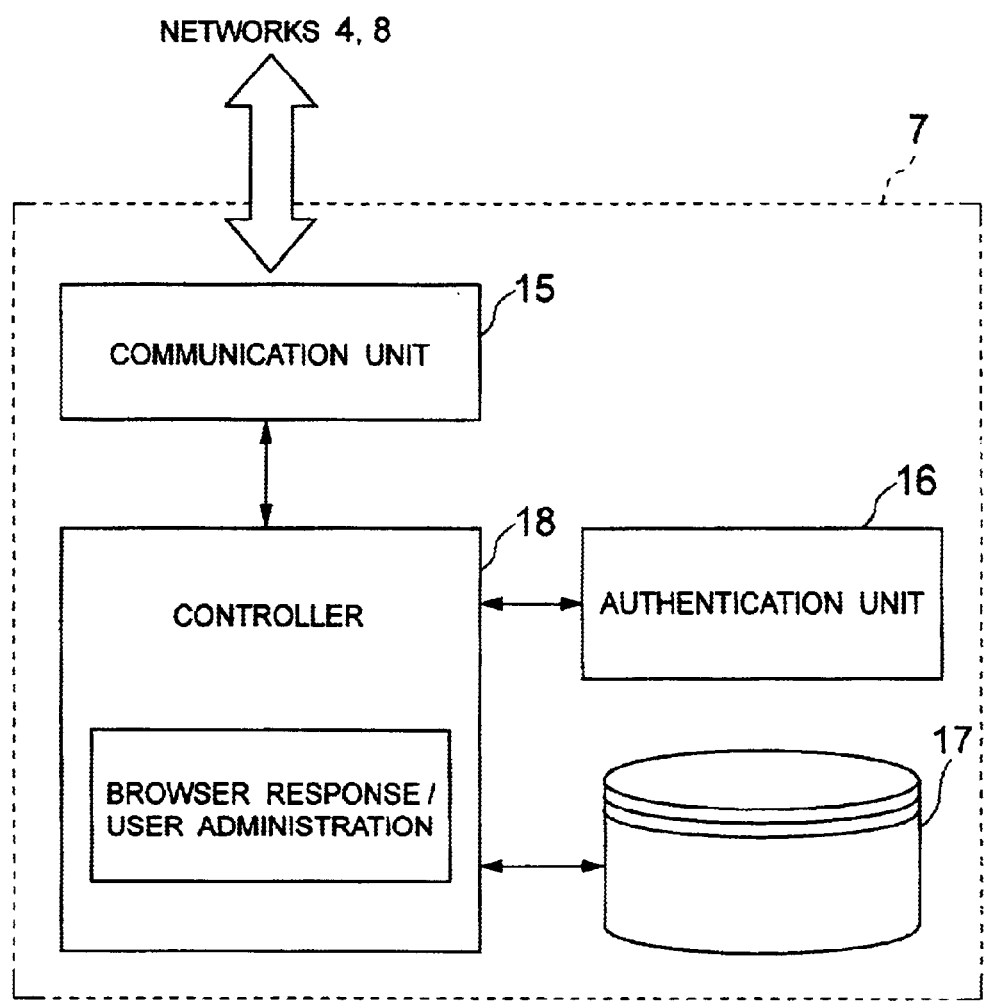
FIG. 2 is a block diagram showing a structure of a server located in a cellular telephone company according to a first embodiment of the present invention.

Referring to FIG. 2, illustrated is a block diagram showing a structure of the server 7 provided in the cellular telephone company 5 according to the first embodiment of the present invention. The server 7 includes a communication unit 15 connected to the networks 4 and 8, an authentication unit 16 for user authentication, a storage unit 17 for storing various data, and a controller 18 such as CPU for controlling these units individually and server 7 as a whole. The controller 18 has software and hardware needed to administer the user data and the browser software.

Figure 3:
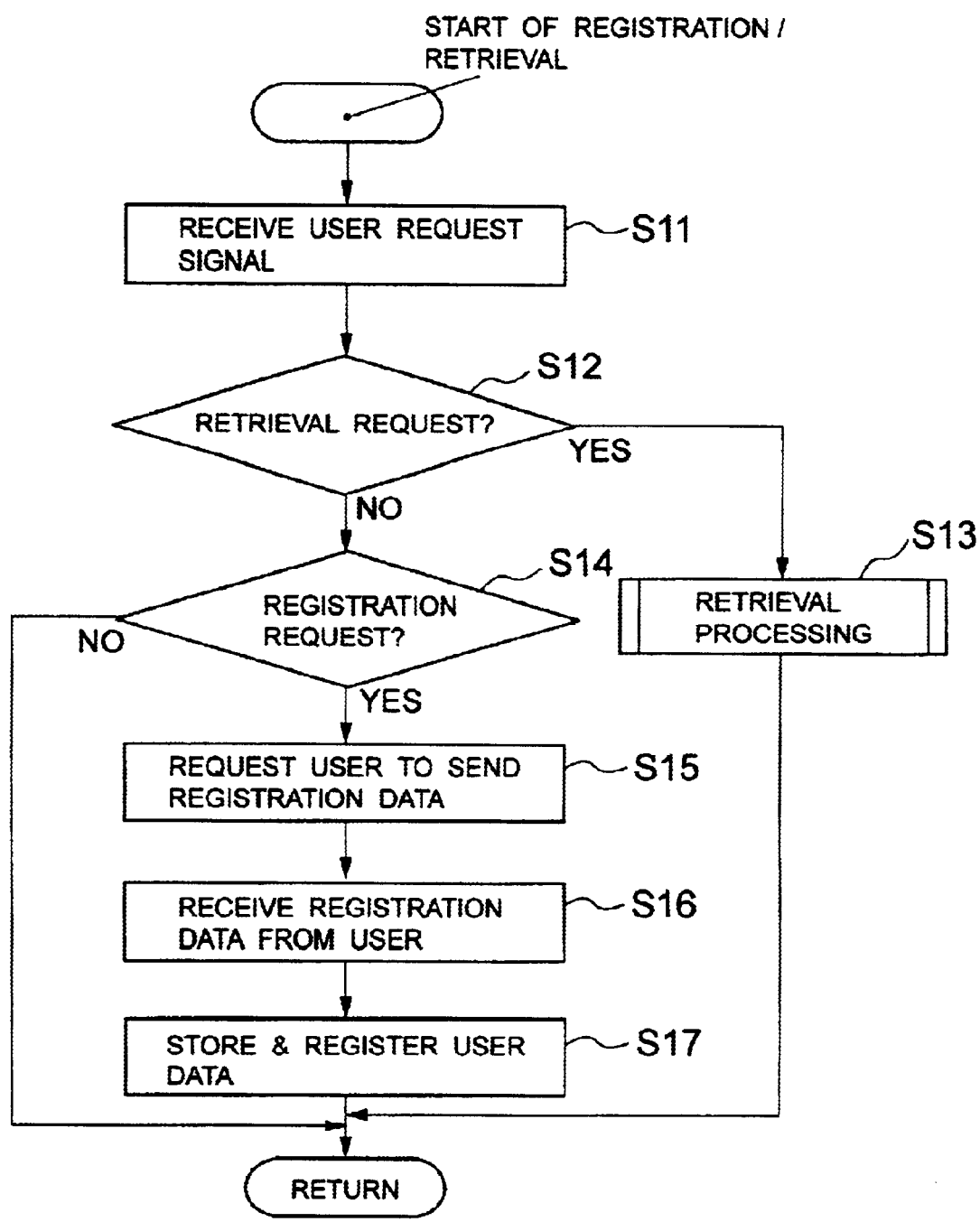
FIG. 3 illustrates a flowchart showing a procedure of a retrieval and registration routine executed by the server according to the first embodiment.

Referring now to a flowchart shown in FIG. 3, a procedure for retrieval and registration routine executed by the server 7 will be described. The processing is made under the control of the controller 18. The following description deals with a case where the portable terminal device 3 is a cellular telephone.

First, the server 7 accepts a user request signal from the cellular telephone 3 or user terminal 9 (Step S11) and determines whether the user request signal is a request for user data retrieval (Step S12). If it is the retrieval request, the program enters at a step S13 a retrieval subroutine, which will be described hereinafter.

If the user request signal is not the retrieval request at Step S12, it is then determined whether it is a request for user data registration (Step S14). If it is not the registration request, the program proceeds out of this routine. If it is the registration request, on the other hand, the server 7 sends a signal requesting the registration data to the cellular telephone 3 or user terminal 9, which has issued the user request signal (Step S15). As shown in FIG. 4, data to be registered in the server 7 includes a user identifier and user data corresponding to a user name. The registration data may also include a recipient address and a recipient identifier to identify that recipient address. If a user name is not registered, the registration data may include the user name. If there are a plurality of user data, the registration data may include a plurality of data identifiers to identify the user data respectively.

The recipient identifier is an identifier of a recipient address, which can be sent and received through a communication line or network, such as URL (Universal Resource Locator) representing a location of a server on the Internet, an email address, and a telephone number.

Upon receiving the registration data (Step S16), the server registers the data that it has received. During the registration, the user identifier is appended to or associated with the user data. If, as described above, the data identifier and recipient identifier are included, these data are associated with the user data and recipient respectively and stored in the storage device 17 to complete the registration (Step S17).

It should be noted that the signals such as the user request signal, the registration data request signal and reply signals in response to these request signals may be a browser display screen signal written in an HTML (Hyper Text Markup Language) or the like.

In the above description, the data registration is conveniently made from the user terminal 9 such as PC, and such way of registration is preferred.

Figure 5:
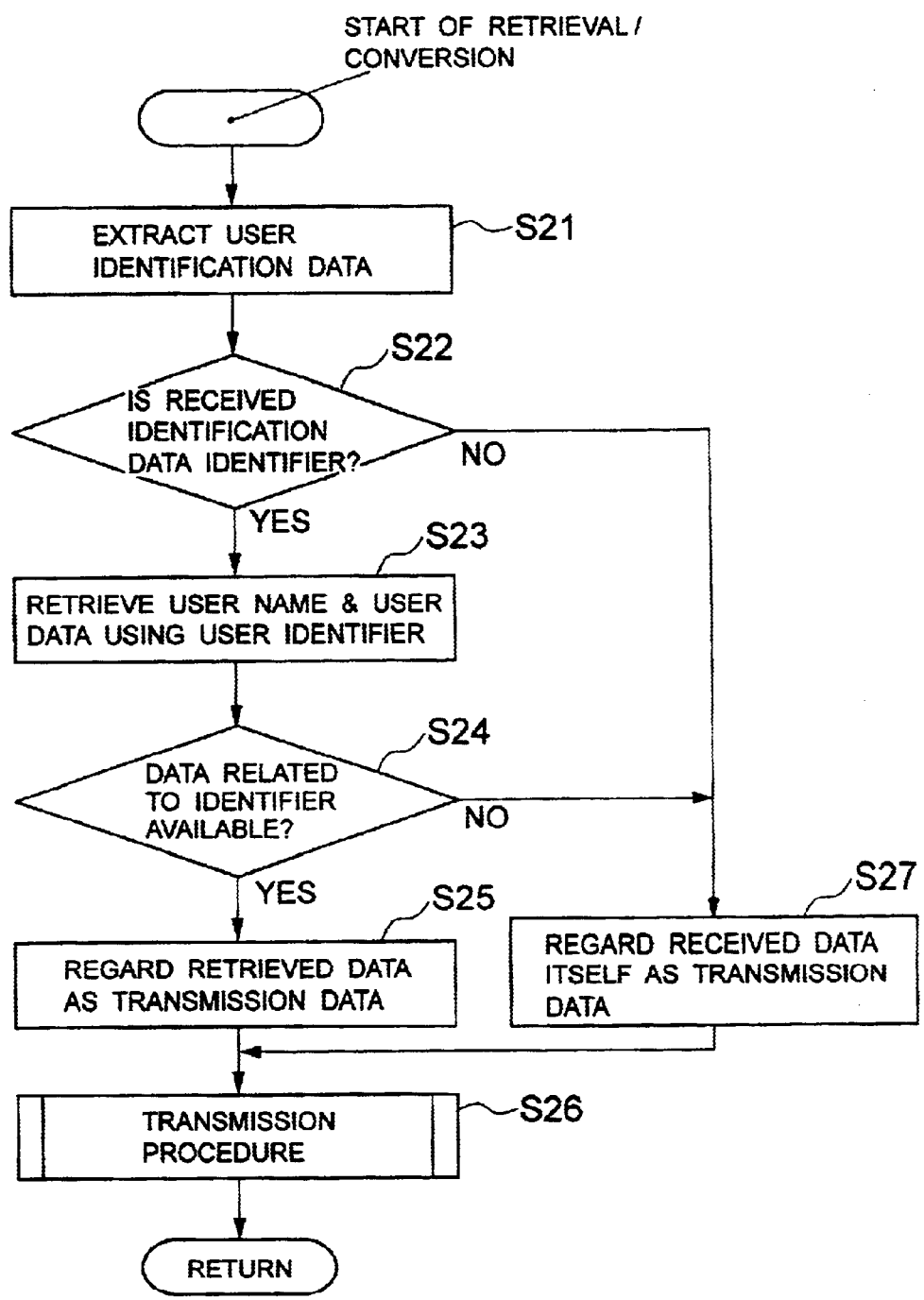
FIG. 5 illustrates a flowchart showing a procedure of a retrieval subroutine executed by the server according to the first embodiment.

A procedure of the retrieval subroutine (Step S13) executed when the user request signal is determined to be the retrieval request at Step S12 will be described in reference to a flowchart shown in FIG. 5.

The controller 18 first extracts user identification data corresponding to the user name from the user request signal (Step S21). It is then determined whether the extracted user identification data is a user identifier (Step S22). If it is the user identifier, the controller 18 retrieves a user name and user data related to the user identifier from the storage device 17 (Step S23). It is determined whether a user name and user data are available in connection with the user identifier (Step S24). If available, the retrieved user name and user data are determined to be sent (Step S25), and the program proceeds to a transmission subroutine to execute the data transmission (Step S26).

If it is determined at Step S22 that the extracted user identification data is not the user identifier, or it is determined at Step S24 that the user name and user data are not available in relation to the user identifier, then the received user identification data is regarded as the user name, and it is immediately determined to be sent (Step S27). Subsequently, the program proceeds to the data transmission subroutine (Step S26).

In the foregoing description, the data retrieval is conveniently carried out from the cellular telephone 3. Specifically, if a user name, a user identifier which consists of a series of characters related to the user name and easy to input as compared with the user name, and/or user data are already registered, it is possible to easily transmit more complicated data by only inputting and sending the user identifier from the cellular telephone 3.

Figure 6:
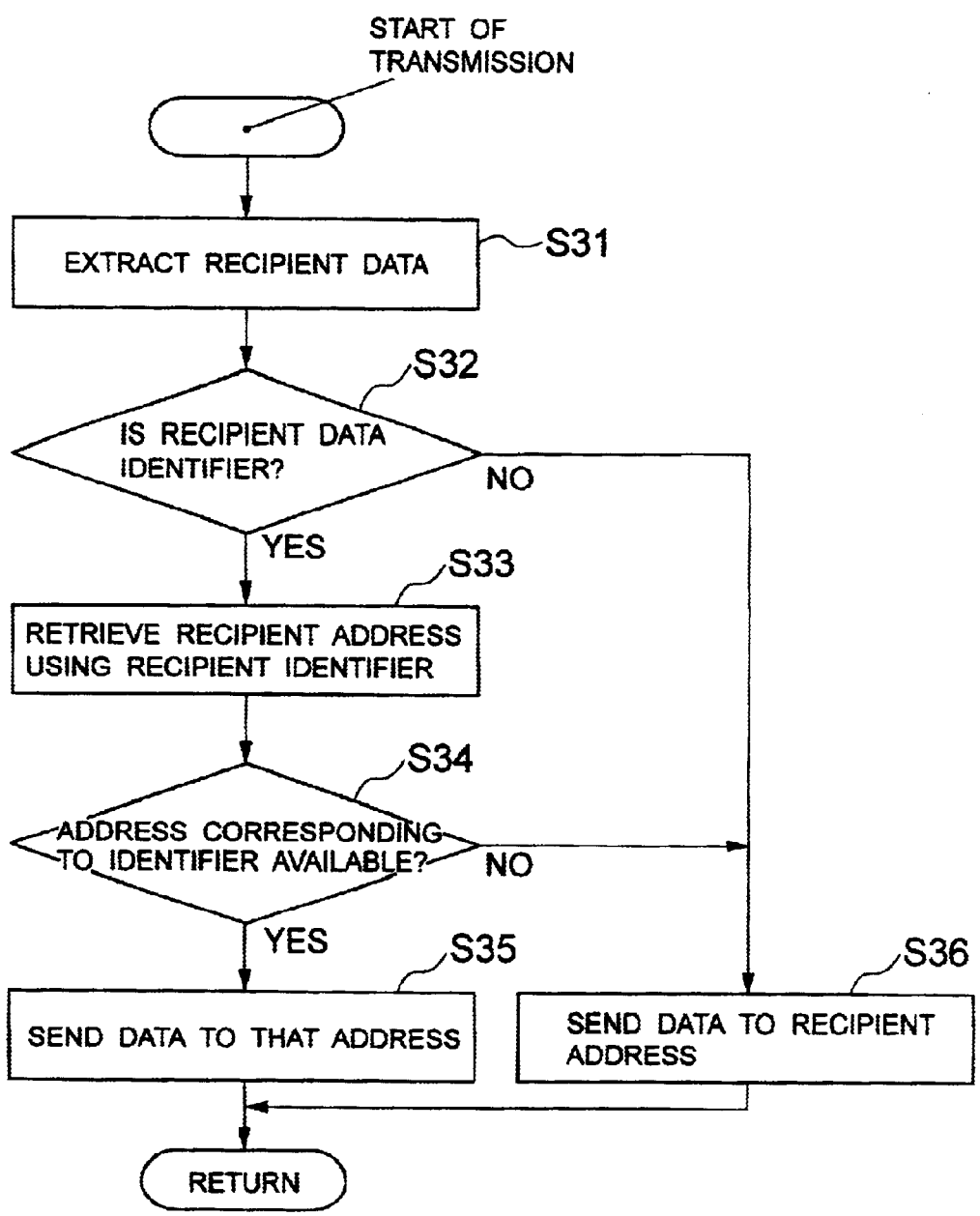
FIG. 6 illustrates a flowchart showing a procedure of a data transmission subroutine performed by the server of the first embodiment.

Next, a procedure of the transmission subroutine executed at Step S26 will be described in reference to a flowchart shown in FIG. 6.

The controller 18 first extracts recipient identification data corresponding to a recipient address from the user request signal (Step S31). The controller then determines whether the extracted recipient identification data is a recipient identifier (Step S32).

If it is the recipient identifier, the controller retrieves a recipient address related to the recipient identifier from the storage device 17 (Step S33). The controller determines whether there is a recipient address related to the recipient identifier (Step S34). If available, the controller sends data, which is given from the above described retrieval subroutine, to the retrieved recipient address (Step S35).

If it is determined at Step S32 that the extracted recipient identification data is not a recipient identifier, or it is determined at Step 34 that there is no recipient address associated with the recipient identifier, then the controller regards the received user identification data as the recipient address, and sends the data, which is given from the above described retrieval subroutine, to that recipient address (Step S36).

The process executed in the above routine will be described more concretely. For example, the user accesses the server 7 of the cellular telephone company 5 from the cellular telephone 3. The user selects desired information or service on a display screen of the cellular telephone 3 sent from the server 7. When responding to this display screen, the user inputs the user identifier on the display screen of the cellular telephone 3 and sends it to the server 7. The server 7 connects the cellular telephone 3 of the user to the service providing company 10 in correspondence to the selected service or the like, or to the server 11 of the service providing company 10 in correspondence to the service or the like selected among those registered by the user beforehand. Alternatively, the server 7 may receive the recipient identifier from the user, retrieve the recipient address related to the recipient identifier, and connect the user to that address. In this case, the server 7 retrieves the user name and/or user data related to the user identifier received from the user, and appends it to the signal to be sent to the server 11.

As described above, by registering the identifier and relevant data beforehand, it is possible to greatly simplify the input operation required to the user of the cellular telephone 3. The user data to be registered may include not only text data, but also voice data, image data or the like. Therefore, the apparatus of the present invention can utilize various kinds of data and is applicable to diverse services.

Second Embodiment

A second embodiment of the present invention that concerns service provision of the server 7 will be described. This processing is executed under the control of the controller 18.

In this embodiment, as shown in FIG. 7, authentication passwords and user groups to which respective users belong are stored in association with the respective users in the storage device 17. Each user group includes at least one user. As illustrated in FIG. 8, user group data are also stored in the storage device 17 in such a manner that they are associated with the user groups respectively. Upon receipt of a request from a user, the server 7 provides a service of sending back to that user the user group data common to a user group to which that user belongs, or sending back to that user other user group data which are permitted to be disclosed to that user. This service providing routine will be described in reference to a flowchart shown in FIG. 9.

As the server 7 receives a log-in request from the cellular telephone 3 (Step S41), it requests the cellular telephone 3 to show an authentication password, and receives the password (Step S42). Subsequently, the server determines whether the received password is valid or not (Step S43). If the received password is not authenticated, the server then determines whether the number of the password inputting operations exceeds a predetermined value (Step S44). If it exceeds the predetermined value, the server sends back a signal indicating that the log-in is not admitted (Step S45), and the program proceeds out of this routine. If the number of password inputting does not exceed the predetermined value, the program proceeds to Step S42 to request the password again.

If the password is valid at Step S43 and therefore the user authentication is made, the server accepts the user identification data (Step S46). The server then determines whether the received user identification data is a user identifier (Step S47). If it is the user identifier, the server retrieves user name and user group related to this user identifier as well as the user group data from the storage device 17 (Step S48).

When it is determined at Step S47 that the received user identification data is not the user identifier, the server 7 requests the user to input necessary data such as a user name and user group data (Step S49). The user then has to input necessary data using input buttons of the cellular telephone 3. The server 7 retrieves a user group of that user and user group data from data given in response to the input request (Step S50).

It is then determined whether the request signal from the user includes a request for disclosing other user group data (Step S51). If such a request is included, the server tries to find other user group data while using the table shown in FIG. 8 or the like (Step S52) to determine whether other user group data is permitted to be disclosed to that user (Step S53). If the disclosure is permitted, the server calculates a fee (Step S54) and stores a result of calculation (Step S55). After that, the server sends the user group data of that user and the other user group data, disclosure of which is permitted to that user (Step S56).

If it is determined at Step S51 that the user request signal does not include a request for disclosing other user group data, the program proceeds to Step S54. If it is determined at Step S53 that there is no data that is permitted for disclosure, the server sends a reply indicating that the disclosure is not permitted (Step S57). In this manner, this routine is completed.

As described above, since the identifier and relevant data are registered beforehand, a plurality of users can share the registered data with a simple input operation using the cellular telephone 3.

Although this embodiment deals with data transmission and reception between the server 7 and cellular telephone 3, data may be sent to other servers as in the first embodiment.

The above described service providing procedure can be used in various applications. For instance, the server 7 may be a corporate server that provides product information to a plurality of users or customers. It is also applicable to a so-called "notice board" from which a plurality of users or employees share information. In this manner, it is possible to realize a server apparatus that can cope with various serves accessible from a cellular telephone.

The server located in the cellular telephone company is described in the above embodiments, but the present invention is not limited in this regard. For example, the present invention is applicable to a server connected to various kinds of line or network such as a public line and network (PSTN, PSDN), wireless line and network, and CATV.

In addition, the present invention is not limited to an apparatus called "server" so far as the apparatus has the above described structure.

It should also be noted that the illustrated embodiments are mere examples. These embodiments may be combined, or modified and changed in some regards.

As understood from the foregoing, the present invention can provide a server apparatus that allows easy data input from a cellular telephone and is able to cope with diverse services.

What is claimed is:

1. A server apparatus for managing communications among portable terminal, devices connected with each other through a network, comprising:

first reception means connected to said network for receiving, as registration data, a user identifier and one or more user data corresponding to said user identifier;

storage means for storing said registration data received by said first reception means;

second reception means connected to said network for receiving a user identifier and a recipient address supplied from either one of said portable terminal devices;

retrieval means for retrieving one or more user datas which are associated with the supplied user identifier, from the stored registration data; and transmission means connected to said network for transmitting the retrieved user datas toward one of said portable devices corresponding to the received recipient address.

2. The server apparatus according to claim 1, in which said first reception means further receives as said registation data a recipient address and a recipient identifier corresponding to said recipient address;

said second reception means receives a user identifier and a recipient identifier from either of one said portable terminal devices;

said retrieval means retrieves one or more user datas and a recipient address which are respectively associated with the user identifier and recipient identifier received by the second reception means from the stored registration data; and said transmission means transmits the retrieved user data toward the retrieved recipient address.

3. The server apparatus according to claim 2, wherein the first reception means receives the registration data from a user terminal device other than the portable terminal device.

4. The server apparatus according to claim 1, wherein said first reception means receives said registration data from a user terminal device which is connected to said network and is other than said portable terminal devices.

5. The server apparatus according to claim 4, wherein said user terminal device is realized by a personal computer connected to said network.

6. The server apparatus according to claim 1, wherein said network is an internet and said recipient address includes an universal resource locator (URL) which is used within said internet, and said transmission means has a device operative on a browser software.

7. The server apparatus according to claim 1, wherein said storage means stores a password related to one of said user identifier, and said second reception means receives a password supplied from one of said portable terminal devices and determines coincidence between the received password and the stored password so as to initiate its receiving function when it detects the coincidence.

8. The server apparatus according to claim 1, wherein said storage means stores the user data received by said first reception means in such a manner that the received user data is associated with a user group identifier related to at least one of said user identifier, and said retrieval means retrieves from said storage means one or more of said user data which correspond to a user group identifier and is received by said second reception means.

9. The server apparatus according to claim 1, wherein the user data includes a character, a voice or image data.

10. The server apparatus according to claim 1 further including calculation means for calculating a fee when transmitting the user data related to the user group identifier.

* * * * *